US010295224B1

United States Patent
Ho et al.

(10) Patent No.: US 10,295,224 B1
(45) Date of Patent: May 21, 2019

(54) BLADED SOLAR THERMAL RECEIVERS FOR CONCENTRATING SOLAR POWER

(71) Applicant: National Technology & Engineering Solutions of Sandia, LLC, Albuquerque, NM (US)

(72) Inventors: Clifford K. Ho, Albuquerque, NM (US); Joshua Mark Christian, Albuquerque, NM (US); John Downing Pye, Canberra (AU)

(73) Assignees: National Technology & Engineering Solutions of Sandia, LLC, Albuquerque, NM (US); Australian National University, Canberra ACT (AU)

( * ) Notice: Subject to any disclaimer, the term of this patent is extended or adjusted under 35 U.S.C. 154(b) by 727 days.

(21) Appl. No.: 14/535,100

(22) Filed: Nov. 6, 2014

Related U.S. Application Data (60) Provisional application No. 61/901,628, filed on Nov. 8, 2013.

(51) Int. Cl.
*F24S 80/30* (2018.01)
*F24S 10/75* (2018.01)

(52) U.S. Cl.
CPC .............. *F24S 10/753* (2018.05); *F24S 80/30* (2018.05)

(58) Field of Classification Search
CPC .................................. F24J 2/265; F24J 2/4647
USPC ........................................................ 126/658
See application file for complete search history.

(56) References Cited

U.S. PATENT DOCUMENTS

| 5,862,800 | A | 1/1999 | Marko |
| 7,011,086 | B2 | 3/2006 | Litwin |
| 7,690,377 | B2 | 4/2010 | Goldman et al. |
| 8,490,618 | B2 * | 7/2013 | Kroizer ................. F24J 2/0494 126/571 |
| 8,613,278 | B2 | 12/2013 | Arbobast et al. |
| 8,789,523 | B1 | 7/2014 | Kribus et al. |
| 2012/0125319 | A1 | 5/2012 | Navio Gilaberte et al. |
| 2013/0192586 | A1 * | 8/2013 | Wasyluk ................. F22B 1/006 126/619 |

FOREIGN PATENT DOCUMENTS

| FR | 2539821 A2 * | 7/1984 | ............. F03D 9/007 |
| WO | WO 2014205488 A1 * | 12/2014 | ................. F24J 2/36 |

* cited by examiner

*Primary Examiner* — Alfred Basichas
(74) *Attorney, Agent, or Firm* — Daniel J. Jenkins (57) ABSTRACT

A bladed solar thermal receiver for absorbing concentrated sunlight is disclosed. The receiver includes a plurality of panels arranged in a bladed configuration for absorbing sunlight. The bladed configurations can be radial or planar. The receiver design increases the effective solar absorptance and efficiency by providing a light trap for the incident solar radiation while reducing heat losses from radiation and convection.

4 Claims, 7 Drawing Sheets

BLADED SOLAR THERMAL RECEIVERS FOR CONCENTRATING SOLAR POWER

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to solar thermal receivers, and more particularly to solar thermal receivers having structures and geometries that increase effective solar absorptance and efficiency.

BACKGROUND

Mounting concerns over the effect of greenhouse gases on global climate have stimulated research focused on limiting greenhouse gas emissions. Solar power generation is particularly appealing because substantially no greenhouse gases are produced at the power generation source.

Concentrated solar power (CSP) generation using solar receivers is known in the art. Briefly, concentrated solar power systems use lenses, mirrors, or other elements to focus sunlight incident on a relatively large area onto a small area called a solar receiver. The concentrated sunlight can be used to heat a fluid within the solar receiver. The fluid heated within the solar receiver can be used to create energy, such as by driving a turbine to generate power or by providing a secondary heat source.

Conventional receivers for concentrating solar power consist of panels of tubes that are arranged in a cylindrical or cubical shape to face the incoming solar irradiance. However, these configurations also maximize radiative and convective heat losses to the environment; most of the sunlight reflected off of these surfaces is lost to the environment.

The need therefore remains for an efficient solar receiver that enables higher efficiency power cycles.

SUMMARY OF THE DISCLOSURE

In an embodiment of the disclosure, a solar receiver is disclosed that includes a plurality of solar receiver panels disposed radially about a central hub having a vertical axis. The plurality of solar receiver panels includes a first fluid header, a second fluid header, and a plurality of tubes fluidly connecting the first and second fluid headers.

In another embodiment of the disclosure, a solar receiver is disclosed that includes a plurality of solar receiver panel systems disposed radially about a central hub having a vertical axis. The plurality of receiver panel systems include a first solar receiver panel, and a second solar receiver panel configured with the first solar receiver panel to form a wedge shape having an apex directed away from the vertical axis.

In another embodiment of the disclosure, a solar receiver is disclosed that includes a support panel, and a plurality of solar receiver panels attached to and extending from the support panel. The at least one solar receiver panel of the plurality of solar receiver panels includes a first fluid header, a second fluid header, and a plurality of tubes fluidly connecting the first and second fluid headers.

In another embodiment of the disclosure, a solar receiver is disclosed that includes a shroud disposed above a plurality of solar receiver panels. The shroud is configured to retain heat by capturing heated air and reflecting radiation lost by the plurality of solar receiver panels.

One advantage of the present disclosure is to provide a solar receiver that will significantly increase the absorbed solar radiation while reducing heat losses (radiative and convective), yielding higher thermal efficiencies, improved performance, and reduced costs for concentrating solar power tower systems.

Another advantage of the present disclosure is that the receiver footprint (optical intercept area) can be smaller with the same exposed surface area and surface irradiance, which will reduce heat losses. Large structural cavities, which are used to reduce radiative heat losses, can also be avoided.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to a solar receiver, hereinafter referred to as a "receiver," that reduces the amount of radiative energy loss while increasing absorbed radiation, yielding higher thermal efficiencies, improved performance, and reduced costs for concentrating solar power tower systems. The disclosed receiver includes panels of tubes arranged either radially (in a star pattern) or along a vertical or horizontal plane. The disclosed receiver reduces the local radiative view factors and heat losses and increases the amount of absorbed energy from the heliostat field.

The disclosed receiver can operate at high temperatures (>650° C.) while reducing radiative and convective heat losses at high concentration ratios (1000 suns or more) to achieve high annual thermal efficiencies. In an embodiment, a STAR (Solar Thermal Advanced Receiver) receiver is disclosed that reduces total heat transfer losses (radiation and convection) of up to 50% with an increase in thermal efficiency of nearly 10%. This translates into significant cost savings by requiring fewer heliostats for the same amount of thermal output. Achieving these metrics is necessary to reduce the levelized cost of electricity of concentrating solar power towers to levels comparable with current fossil-fueled power plants.

Figure 1:
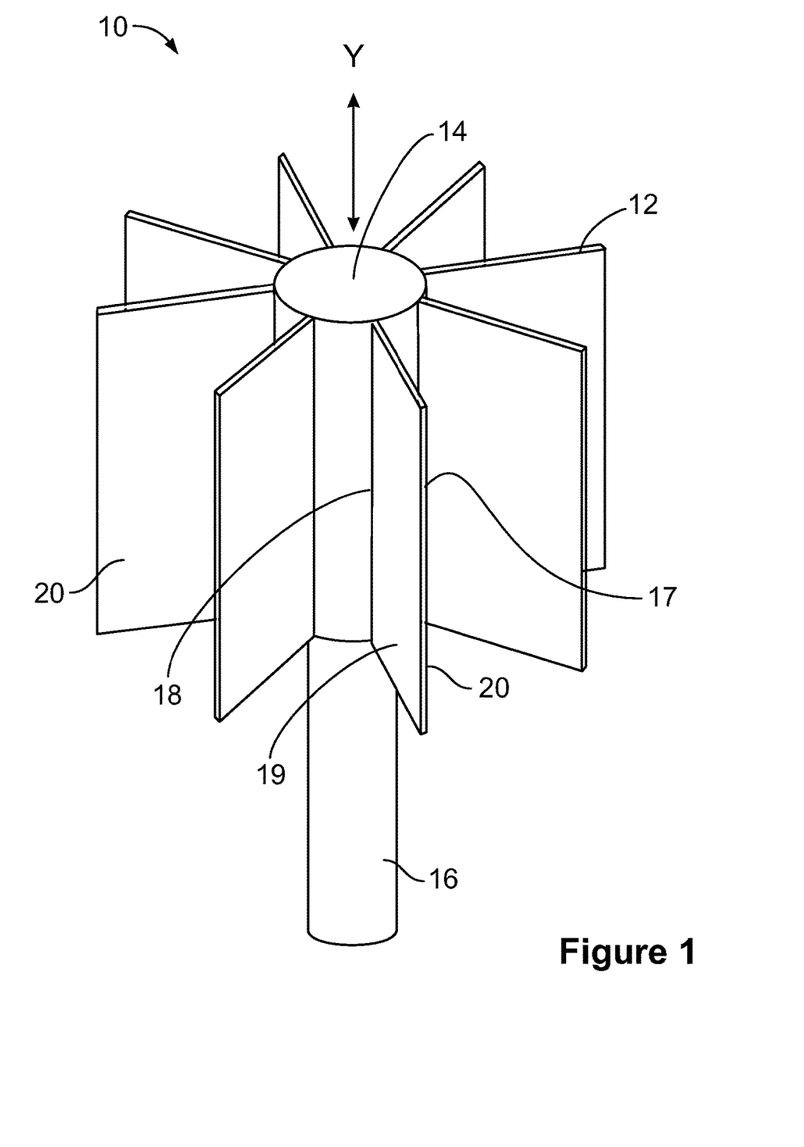
FIG. 1 is an illustration of a solar receiver according to an exemplary embodiment of the disclosure.

FIG. 1 illustrates an embodiment of the present disclosure. According to this embodiment, a receiver 10 is disclosed that includes a plurality of receiver panels 12 radially disposed about and extending from a central hub 14. The receiver panels 12 may be referred to as blades. In this exemplary embodiment, the receiver panels 12 radiate perpendicular from the central axis Y of the hub 14. The hub 14 is connected to a tower 16 for elevating the receiver 10 above a surface (not shown). The receiver panels 12 have a leading edge 17 that is distant from the hub 14, and a trailing edge 18 that is proximate to the hub 14. In this and in other drawings of the disclosure, the hub and other components are not necessarily to scale, and may be large enough to contain piping and other features within. Each segment of the radial structure can be modular, consisting of the outward radial receiver panels and the portion of the hub that connects the radial receiver panels.

Additionally, the receiver panels 12 have a first side 19 and a second side 20 opposite the first side 19. The first and second sides 19, 20 may be coated or treated with heat absorbing surfaces, coatings or textures to efficiently capture the incident concentrated solar radiation. As can be seen in FIG. 1, both first and second sides 19, 20 sides of the receiver panels 12 can be illuminated. The radially extending blade design increases the effective solar absorptance and efficiency by providing a light trap for the incident solar radiation while reducing heat losses from radiation and convection.

In this exemplary embodiment, the receiver 10 includes eight receiver panels 12, however, in another embodiment, the receiver 10 may include 2 or more receiver panels 12. In another embodiment, the receiver 10 may include between 2 and 1000 receiver panels. In another embodiment, the receiver 10 may include between 3 and 20 receiver panels. In another embodiment, the receiver 10 may include between 4 and 10 receiver panels. In an embodiment, receiver panels may include one or more tubes with or without a header. As can be seen in FIG. 1, both sides of the receiver panels 12 can be illuminated.

The hub 14 provides a central attachment point for the receiver panels 12. In addition, the hub 14 and/or tower 16 may include piping for fluidly connecting the receiver panels 12 to a fluid source and fluid receiver (not shown) as would be appreciated by one of ordinary skill in the art. Further in addition, the hub 14 and/or tower 16 may include pumps, valves and/or other fluid transport and control devices for providing and/or controlling fluid to the receiver panels 12.

In this exemplary embodiment, the receiver panels 12 are attached to the hub 14. In another embodiment, the receiver panels 12 may be pivotally attached to the hub 14 in a manner that allows the receiver panels 12 to be pivoted about the Y axis. For example, one or more of the receiver panels 12 may be pivoted so as to face a surface more perpendicular to solar irradiance.

Figure 2:
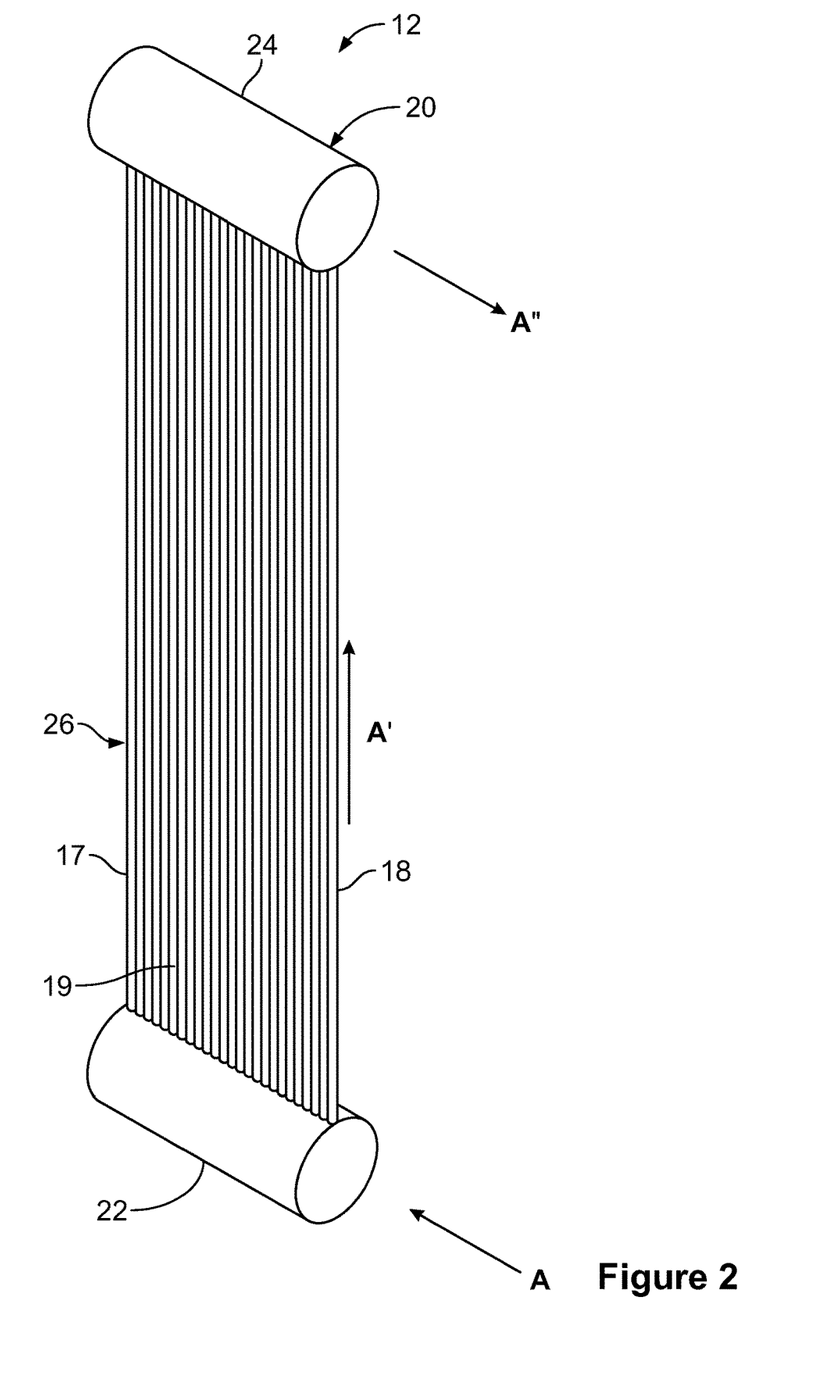
FIG. 2 is an illustration of a solar receiver panel according to an exemplary embodiment of the disclosure.

FIG. 2 illustrates an example of a receiver panel 12 according to an embodiment of the invention. As can be seen in FIG. 2, the receiver panel 12 includes a first manifold 22, a second manifold 24, and a plurality of tubes 26 disposed between the first and second manifolds 22, 24. In this exemplary embodiment, the first manifold 22 receives a fluid from the hub 14 or tower 16 in the direction shown by arrow A. The fluid is then distributed to the plurality of tubes 26 and flows in direction A' to the second manifold 24, where it is collected and flows to the hub 14 or tower 16 in direction A". In another embodiment, the direction of flow may be reversed. The first and second manifolds 22, 24 may include piping, baffling or other fluid control and distribution components to provide and control the flow of fluid to the tubes 26. In this exemplary embodiment, the tubes 26 have a generally circular cross section. In another embodiment, the tubes 26 may have other cross sections, such as, but not limited to square, rectangular, and oval. Additionally, in this exemplary embodiment, the tubes 26 are in close proximity or touching adjacent tubes. In an embodiment, some minimal spacing may be present to allow for expansion.

As can be seen in FIGS. 1 and 2, receiver panels 12 have first side and second sides 19, 20. The first and second sides 19, 20 may be coated or treated with heat absorbing surfaces, coatings or textures to efficiently capture the incident concentrated solar radiation.

Figure 3:
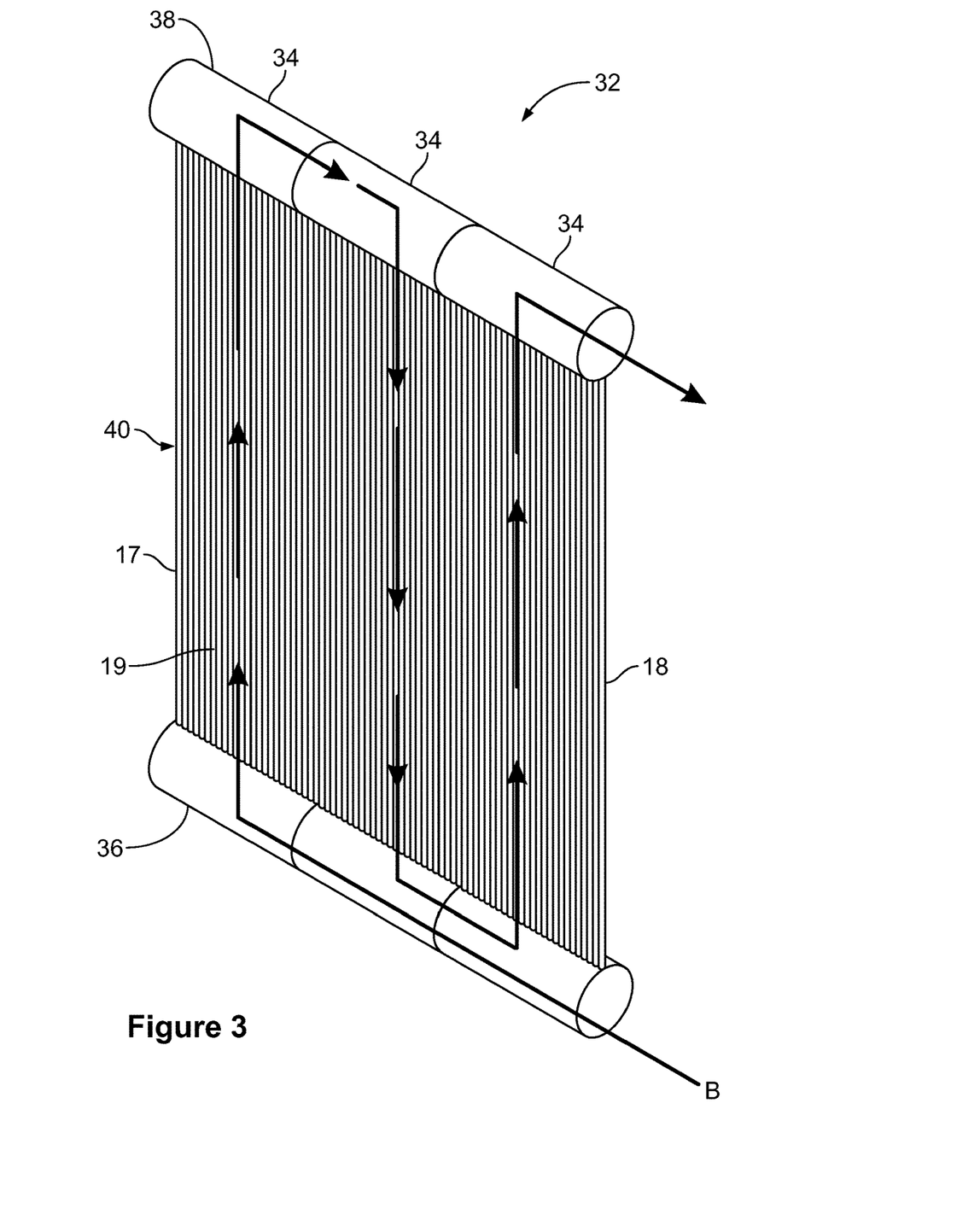
FIG. 3 is an illustration of a solar receiver panel according to another exemplary embodiment of the disclosure.

FIG. 3 illustrates another example of a receiver panel 32 according to another embodiment of the disclosure. As can be seen in FIG. 3, the receiver panel 32 includes receiver sub-panels 34. Similar to receiver panel 12 shown in FIG. 2, receiver panel 32 includes a leading edge 17, a trailing edge 18, a first side 19, and a second side 20 (opposite the first side 19, but not shown). In this exemplary embodiment, the receiver panel 32 includes three receiver sub-panels 34. In another embodiment, the receiver panel 32 may include two or more receiver sub-panels. Fluid flow is indicated by arrows B. In another embodiment, the direction of fluid flow may be reversed. In another embodiment, the fluid may enter the first bottom sub-panel and be redirected to the tubes (as would be the case if the receiver panel were flipped so the bottom header was the top header). In another embodiment, the fluid direction of the flipped receiver panel may be reversed. In this exemplary embodiment, fluid is first provided to the tubes of the panel closest to the leading edge 17. In another embodiment, fluid may be first provided to the tubes of the panel closest to the trailing edge 18.

Each receiver sub-panel 34 includes a first manifold 36, a second manifold 38, and a plurality of tubes 40 receiving fluid flow the first manifold 36 and providing fluid to the second manifold 38. The first and second manifolds 36, 38 may include piping, baffling or other fluid control and distribution components to provide and control the flow of fluid to the tubes 40. In this exemplary embodiment, the tubes 40 have a generally circular cross section. In another embodiment, the tubes 40 may have other cross sections, such as, but not limited to square, rectangular, and oval.

Figure 4:
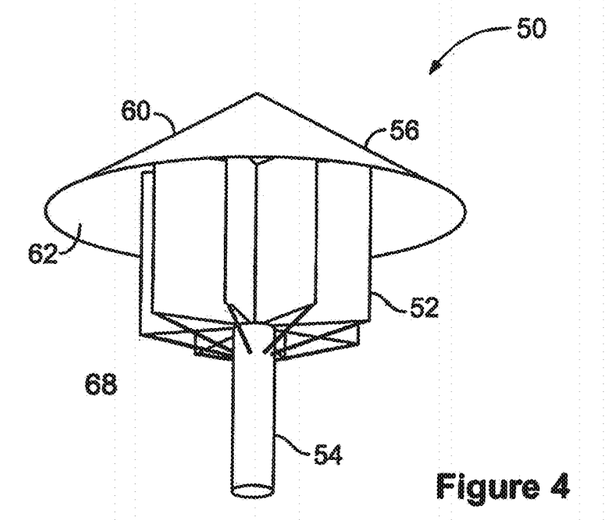
FIG. 4 is an illustration of a solar receiver according to another exemplary embodiment of the disclosure.

FIG. 4 illustrates another example of a receiver 50 according to another embodiment of the disclosure. As can be seen in FIG. 4, the receiver 50 includes a plurality of receiver panels 52 and a tower 54. The receiver 50 further includes a hub (not shown). In general, the receiver 50 has the same panel structure as the embodiment shown in FIG. 1. In addition, the receiver 50 of this embodiment includes a top shroud 56 and bottom supports 58. The bottom supports 58 connect and stabilize the receiver panels to the tower 54.

The top shroud 56 provides a structure that reduces both convective and radiative losses. Solar reflections and radiative thermal emissions from the surface of the receiver can be intercepted by the shroud and reradiated back to the receiver. In addition, the shroud impedes the upward natural convection of hot air from the receiver surface, thereby reducing convective heat losses. The top shroud 56 includes an outside surface 60 and an inside surface 62. The inside surface 62 may be coated with a durable reflective surface, and the outer surface may be insulated to reduce convective and radiative losses.

Figure 5:
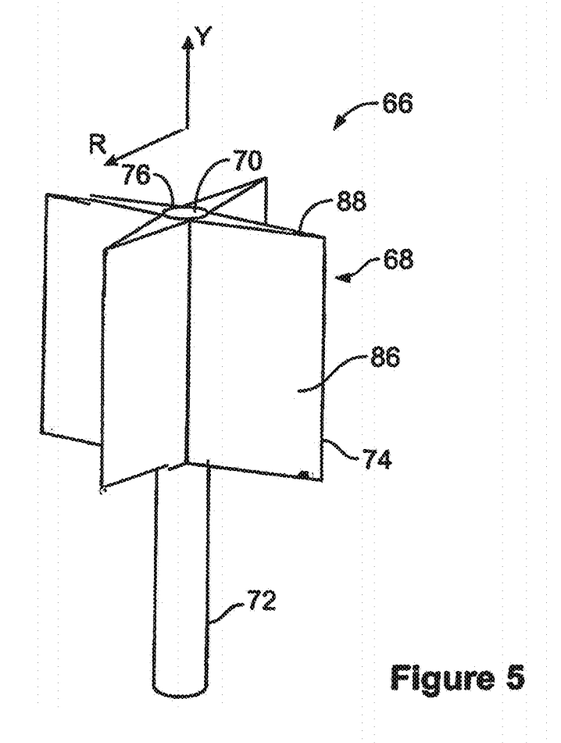
FIG. 5 is an illustration of a solar receiver according to another exemplary embodiment of the disclosure.
Figure 6:
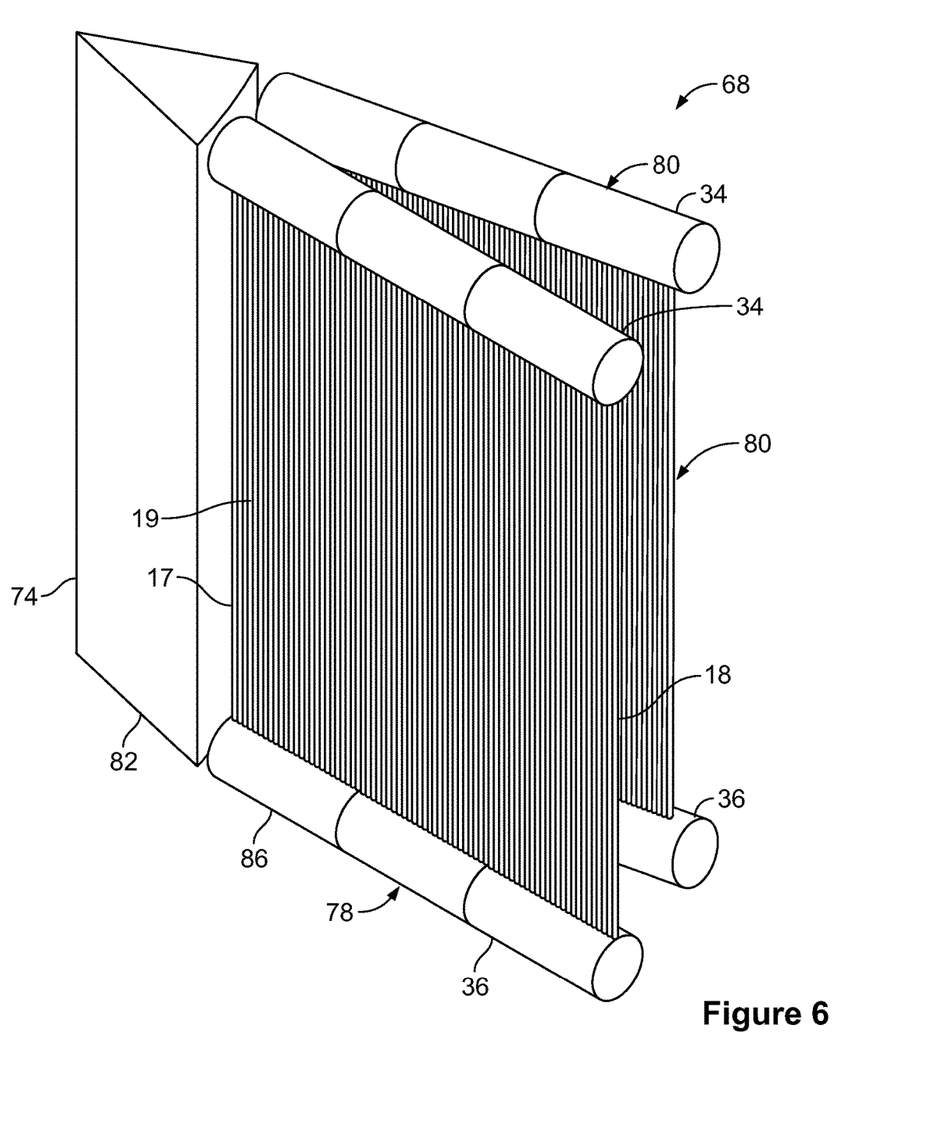
FIG. 6 is an illustration of a solar receiver panel system according to an exemplary embodiment of the disclosure.
Figure 7:
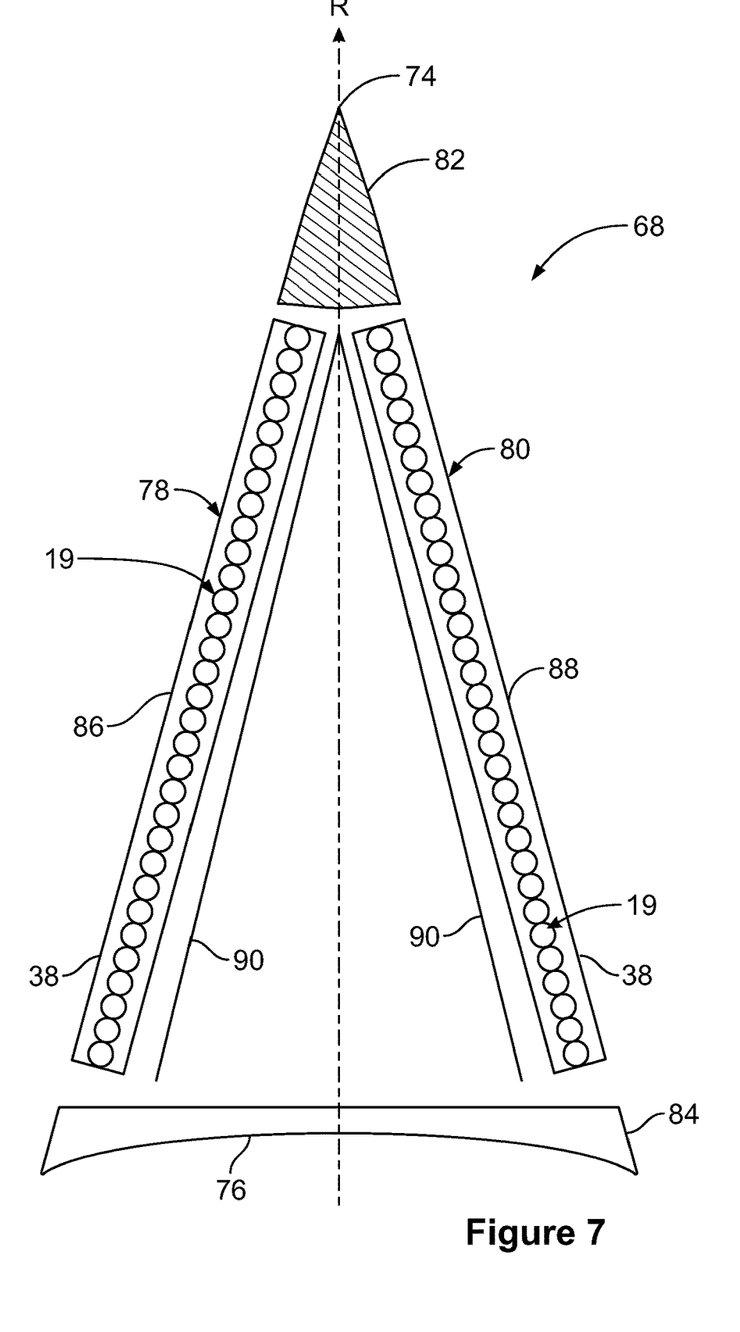
FIG. 7 is a partial cut away overhead view of one of the solar receiver panel system of the solar receiver shown in FIG. 5 having the top headers cut away to show the tubes.

FIGS. 5, 6 and 7 illustrate another exemplary embodiment of a receiver 66 according to an embodiment of the disclosure. As can be seen in FIG. 5, the receiver 66 includes a plurality of receiver panel systems 68 connected to and radially disposed about a central hub 70. The plurality of receiver panel systems 68 extend from the central hub 70 in a radial direction. In this exemplary embodiment, the radial axis of the receiver panel systems 68 radiate perpendicular from the central axis Y of the hub 70 in radial direction R. The hub 70 is connected to a tower 72 for elevating the receiver 66 above a surface (not shown). The receiver panel systems 68 have a leading edge 74 that is distant from the hub 70, and a trailing edge 76 that is proximate to the hub 70.

As can be seen in FIGS. 6 and 7, the receiver panel system 68 include a first receiver panel 78 and a second receiver panel 80 that generally come together to form a wedge or triangular shape that apexes in the radial direction. The receiver panel system 68 may include a nose panel, cap or other structural member 82 that provides structural support and aerodynamic streamlining to the receiver panel system 68. The receiver panel system 68 may further include a rear panel, cap or structural member 84 that provides structural support and connection to the hub 70. The receiver panel system 68 includes a first side 86 and a second side 88. In addition, the receiver panel system 68 may include insulation and/or reflective material or components 90 (see FIG. 7, not shown on FIG. 6 for clarity) disposed behind the first and/or second receiver panels 78, 80 for providing thermal control and/or for reflecting irradiance back upon the sub-panels. The receiver panel system 68 may include additional structures and supports for joining and/or supporting the panel components.

In this exemplary embodiment, the receiver 66 includes four receiver panel systems 68, however, in another embodiment, the receiver 66 may include 2 or more receiver panel systems 68. In another embodiment, the receiver 66 may include between 2 and 1000 receiver panel systems. In another embodiment, the receiver 66 may include between 3 and 20 receiver panel systems. In another embodiment, the receiver 66 may include between 4 and 10 receiver panel systems. In an embodiment, receiver panels forming the receiver panel systems may include one or more tubes with or without a header. As can be seen in FIG. 5, both sides of the receiver 66 can be illuminated.

The hub 70 provides a central attachment point for the receiver panel systems 68. In addition, the hub 70 and/or tower 72 may include piping for fluidly connecting the receiver panel systems 68 to a fluid source and fluid receiver (not shown) as would be appreciated by one of ordinary skill in the art. Further in addition, the hub 70 and/or tower 72 may include pumps, valves and/or other fluid transport and control devices for providing and/or controlling fluid to the receiver panel systems 68.

In this exemplary embodiment, the receiver panel systems 68 are attached to the hub 70. In another embodiment, the receiver panel systems 68 may be pivotally attached to the hub 70 in a manner that allows the receiver panel systems 68 to be pivoted about the Y axis. For example, one or more of the 68 may be pivoted so as to face a surface more perpendicular to solar irradiance.

FIGS. 6 and 7 show a more detailed illustration of a receiver panel system 68 according to an embodiment of the invention. The rear cap 84 has been removed from FIG. 6 for clarity. As can be seen in FIGS. 6 and 7, the first and second receiver panels 78, 80 are similar in shape and structure, and will described by referencing the first receiver panel 78, while being understood that corresponding similar components are shown on the second receiver panel 80.

Referring again to FIGS. 6 and 7, the first receiver 78, which has a general panel structure, is structured similar to the receiver panel 32 shown on FIG. 3, and includes the variations as discussed with the various embodiments, including, but not limited to being constructed of a single panel. In addition, this embodiment may include piping and/or other structures that may allow for fluid to be provided between the first and second receiver panels 78, 80. It should be noted that in this embodiment, illumination does not directly impact the interior side of the tubes of the sub-panels, although sunlight may be reflected to the interior side of the tubes.

Figure 8:
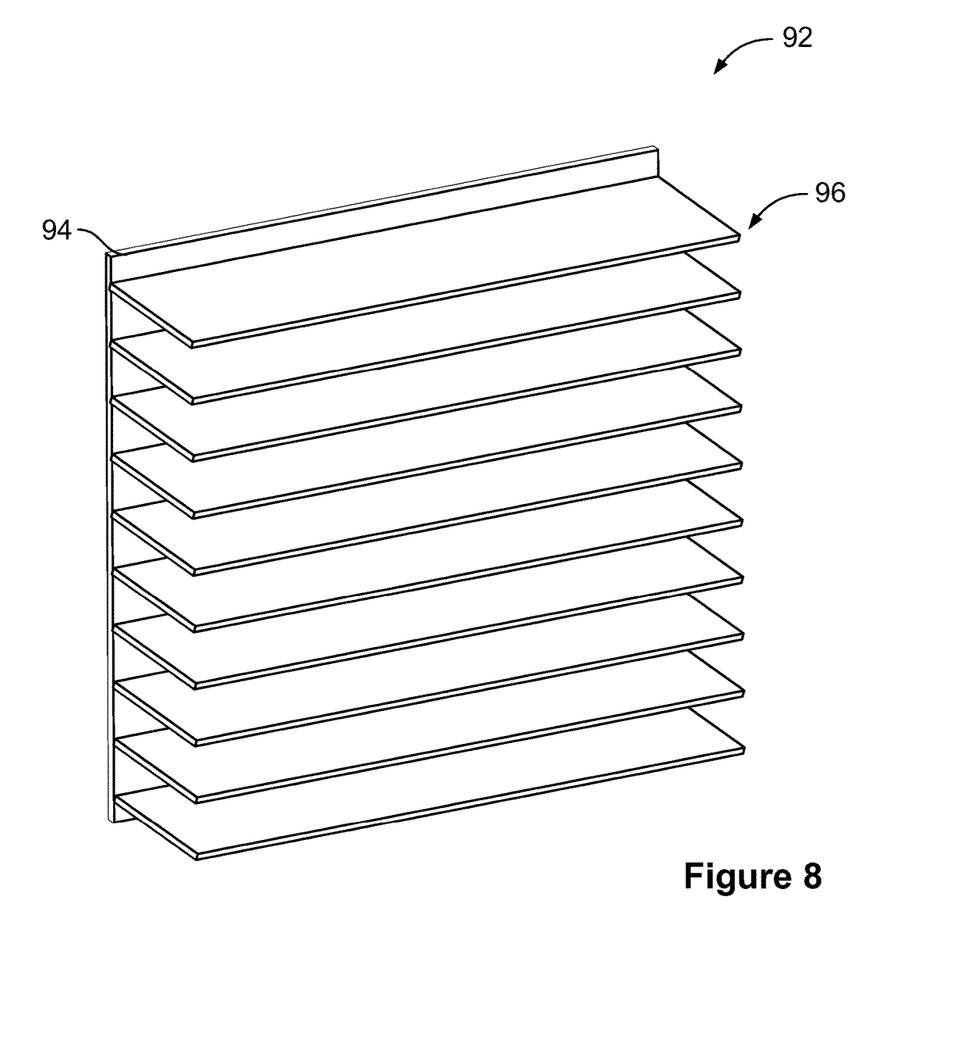
FIG. 8 is an illustration of a solar receiver according to another exemplary embodiment of the disclosure.

FIG. 8 illustrates another example of a receiver 92 according to another embodiment of the disclosure. As can be seen in FIG. 8, the receiver 92 includes a support panel 94 and plurality of receiver panels 96. The support panel 94 serves a similar function as the hub 14 (FIG. 1) of a previous embodiment, and may include piping, pumps, and fluid and support structures. The plurality of receiver panels 96 extend from the plane of the receiver 92. In an embodiment, the support panel 94 may be attached to a tower as also shown in FIG. 1. The extending blade design increases the effective solar absorptance and efficiency by providing a light trap for the incident solar radiation while reducing heat losses from radiation and convection.

The receiver panels 96, which have a general panel structure, are structured similar to the receiver panel 32 shown on FIG. 3, and includes the variations as discussed above with the various disclosed panel embodiments, including, but not limited to being constructed of a single panel or multiple panels. In this exemplary embodiment, the support panels 96 are aligned and attached horizontally to the support panel 94, or in other words, the flow in the tubes is horizontal in relation to any surface the receiver 92 is disposed above, and as similarly shown in FIG. 3. In another embodiment, the receiver panels 96 may be aligned and attached vertically upon the support panel 94. In another embodiment, the receiver panels 96 may be attached at any angle to the support panel 92. In this exemplary embodiment, the receiver panels 96 are rigidly attached to the support panel 94. In another embodiment, the receiver panels 96 may be pivotally attached to the support panel 94.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A solar receiver, comprising:
a plurality of solar receiver panels disposed radially about and attached to a central hub having a vertical axis;
wherein the plurality of solar receiver panels comprise:
a first fluid header;
a second fluid header; and
a plurality of tubes fluidly connecting the first and second fluid headers;
wherein one or more of the plurality of solar receiver panels can pivot about the hub with respect to the vertical axis; and
wherein the plurality of solar panels can pivot radially about the central hub relative to the vertical axis.

2. The solar receiver of claim 1, wherein the plurality of solar receiver panels extend radially from the vertical axis.

3. The solar receiver of claim 1, wherein at least one of the plurality of solar receiver panels comprises two or more solar receiver sub-panels.

4. The solar receiver of claim 3, wherein the solar receiver sub-panels comprise:
a first sub-panel fluid header;
a second sub-panel fluid header; and
a plurality of sub-panel tubes fluidly connecting the first and second sub-panel fluid headers.

* * * * *